(No Model.)
G. C. BLICKENSDERFER.
TYPE WRITING MACHINE.
No. 432,295. Patented July 15, 1890.
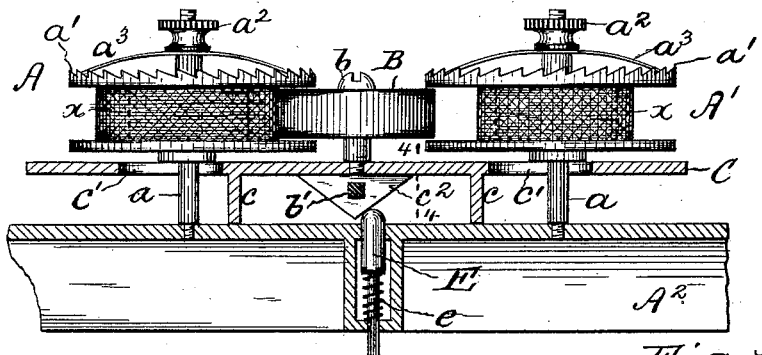
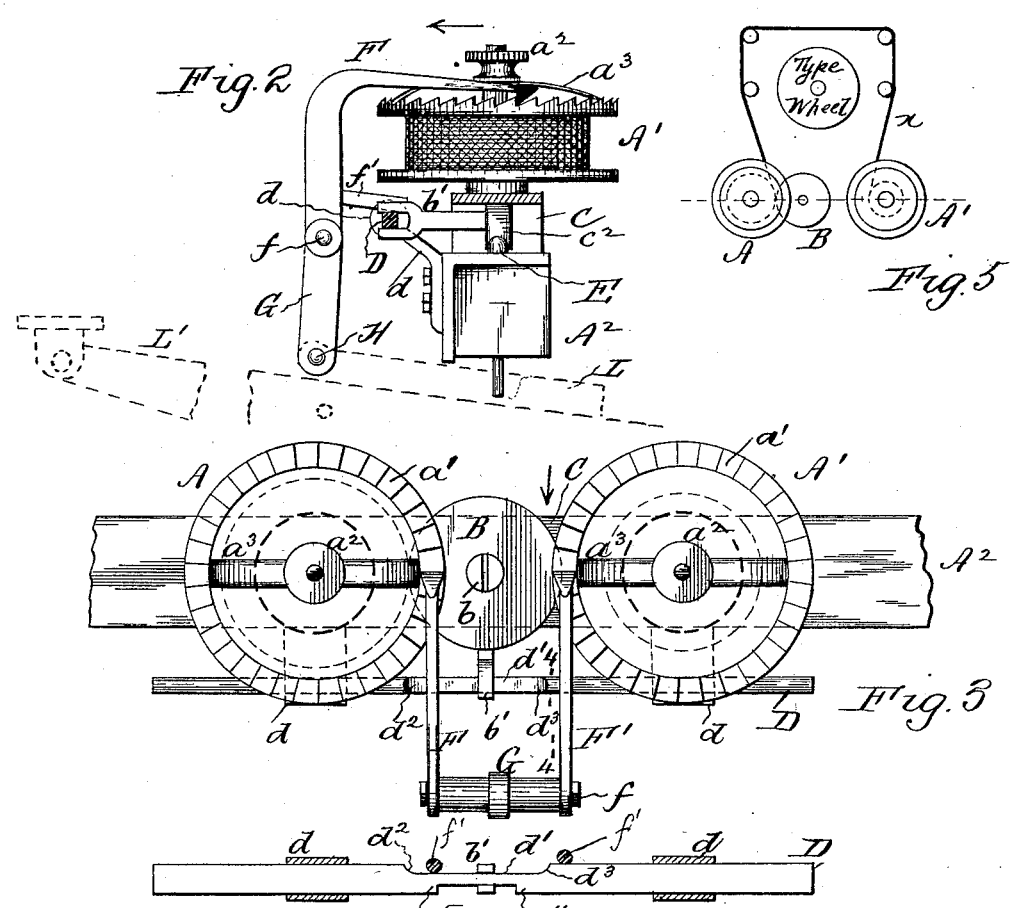
WITNESSES:
M. H. Walker
Chas F. Van Horn
INVENTOR
George C. Blickensderfer
By S. J. Van Stavoren
M. F. Halleck
attorneys

UNITED STATES PATENT OFFICE.

GEORGE C. BLICKENSDERFER, OF STAMFORD, CONNECTICUT, ASSIGNOR TO THE BLICKENSDERFER MANUFACTURING COMPANY, OF NEW YORK, N. Y.

TYPE-WRITING MACHINE.

SPECIFICATION forming part of Letters Patent No. 432,295, dated July 15, 1890.

Application filed July 5, 1889. Serial No. 316,586. (No model.)

*To all whom it may concern:*

Be it known that I, GEORGE C. BLICKENSDERFER, a citizen of the United States, residing at Stamford, in the county of Fairfield and State of Connecticut, have invented certain new and useful Improvements in Automatically-Acting Shifting Devices for the Inking-Ribbon-Feeding Mechanism for Type-Writing Machines, of which the following is a specification.

My invention has relation to shifting mechanism for automatically reversing the rotation of the inking-ribbon spools or reels to correspondingly change the direction of movement or feed of the inking-ribbons of a type-writing machine when the ribbon is fully unwound from one spool or reel and is correspondingly wound upon the remaining spool.

My invention has for its object a simple and effective form of shifting mechanism for automatically reversing the direction of rotation of spools or reels to change the direction of feed of the inking-ribbon.

My invention accordingly consists of the combinations, constructions, and arrangements of parts, as hereinafter described in the specification, and pointed out in the claims.

Reference is to be had to the accompanying drawings, wherein—

Figure 1 represents a pair of inking-ribbon spools or reels and a form of automatic shifting device embodying my improvements. Fig. 2 is an end elevation, partly sectional, on lines 4 4, Figs. 1 and 3; and Fig. 3 is a plan of same. Fig. 4 is a detail sectional elevation, and Fig. 5 is a diagrammatic view showing the position of the reels or spools with automatically-acting shifter-wheel and the inking-ribbon relatively to a form of type-wheel which is used as a hammer and as shown, described, and claimed in another pending application filed by me of an even date herewith, Serial No. 316,591.

A and A' represent a pair of inking-ribbon reels or spools for a type-writing machine, which reels or spools may be constructed and arranged for operation to suit the kind of machine to which they are to be applied. Their construction and arrangement, except as hereinafter noted, forms no part of my invention, as they, with suitable modifications in construction and arrangements of parts, are applicable to all the well-known ribbon-winding devices for type-writing machines.

In the drawings, the spools or reels A A' are such as are convenient for use in a form of type-writer having a type-wheel which is also vibrated as a hammer, to make the impression and in which the spools or wheels are generally horizontal on vertical shafts and arranged or located close together, and they are loosely mounted on the fixed shafts $a\ a$, secured to, preferably, a fixed cross or other bar $A^2$ of the machine in any suitable manner. Said spools have suitable ratchet-wheels $a'$, secured to or forming a part of the same. At the top of the shafts $a\ a$ are thumb-nuts $a^2$ for tensioning plate or other springs $a^3$, mounted on shafts $a$, and the free ends of which exert a downward pressure upon the top of the reels or spools to cause them to retain their seats and not revolve faster than is necessary for a proper operation of the parts.

Between the spools A A', so as to enter between their ends and contact with the outer coil of ribbon $x$ on any one of the spools, is a roller or wheel B, which is journaled on a shaft $b$, secured to a sliding plate C. This plate has a gradual sliding movement imparted to it alternately backward and forward by the corresponding movement of the wheel B, under the influence of the gradual filling or coiling of the ribbon on alternate spools. This plate C, as is shown in the drawings, has legs $c$ mounted upon the cross-bar $A^2$, and is provided with elongated slots $c'$, through which the spool-shafts $a$ pass, so that plate C can longitudinally slide back and forth without interference from the spool-shafts $a$, which shafts serve also as guides for said plate. On the under side of plate C is a double or reverse wedge-shaped projection or cam $c^2$, having its reversely-inclined faces sloping toward the spools. One of these faces is always in contact with a spring-actuated pin E, which, as shown, has an outward or upward spring-pressure contact with the faces of the wedge $c^2$. The pin E acts to steady said gradual movement of plate C and wheel B. When the apex of the wedge passes the pin, so that it contacts with the opposite side of the wedge, the upward pressure of spring $e$ for said pin acts to push it up against said opposite side of the wedge and impart a quick sliding movement to the plate C to throw the wheel B out of contact with a full spool and into contact with the last coil of ribbon on the other or empty spool, which then becomes the winding-spool, so that winding or coiling of the ribbon on a spool gradually moves the wheel B and plate C toward the spool from which the ribbon is unwinding, and when said winding-spool is full the spring-pin E is then in position to quickly complete the movement of plate C or throw it and wheel B toward the unwinding-spool to bring wheel B into contact with the hub of said spool or the last coil of ribbon thereon, which spool then becomes the winding-spool for moving said plate and wheel in an opposite direction to get into position ready to be thrown over to said first-named spool by the pin E when the winding-spool is full.

The wedge $c^2$ carries an arm $b'$, which at its outer end embraces a bar D, sliding in suitable bearings $d$, secured to cross-bar $A^2$, and has a depression $d'$, with upwardly-inclined ends $d^2$ $d^3$ and shoulders or lugs $d^4$ $d^5$ on each side of arm $b'$, and located at some distance apart. The arm $b'$ moves with the plate C and it reciprocates bar D correspondingly with the like movements of plate C by alternately acting upon the shoulders or projections $d^4$ $d^5$ on said bar D. The movement of the bar D occurs only when the spring-pin E comes into action to throw the plate C, and it is for this reason that the shoulders $d^4$ $d^5$ on said bar are wide apart, as they permit the arm $b'$ to partake of the gradual movement of the plate C independent of the bar D. Such gradual movement of arm $b'$ in either direction brings it toward one of the shoulders $d^4$ $d^5$, so that when the pin E acts to quickly throw the plate C the arm $b'$ strikes against one of the shoulders $d^4$ $d^5$ to simultaneously move bar D with the quick throw of plate C.

F F' represent the actuating-pawls for the spools A and A', respectively, only one of which pawls is in action at a time, and when thrown or oscillated in the direction of the arrow, Figs. 3 and 4, they intermittently rotate the spools in opposite directions. Said pawls are located on adjacent opposite sides of the spools to impart reverse rotations thereto. The pawls are mounted or pivoted at $f$ upon a rocker-arm G, secured to a cross-shaft H, having a bail L under control of the key-levers L', as set forth in said other pending application and as partially indicated in the drawings; but any other suitable or well-known feed-actuating mechanism for the pawls F F' may be used to adapt the improvements to different type-writing machines.

The pawls F F' when free to do so have a gravity-contact with the ratchet-wheels $a'$ of the spools in order to rise or slip over the teeth of said ratchet-wheels when making a return movement to get into engagement position therewith.

The pawls F F' each have an arm or finger $f'$ so located that whenever a pawl is in action its finger is in and contacts with the depression $d'$ of bar D, and when not in action the finger is in contact with the upper side of bar D, being brought thereto by the adjacent inclined end $d^2$ or $d^3$ of the depression $d$ when the bar D is shifted. Such movement raises the pawl out of action with its respective spool-ratchet, so that when bar D is shifted by the the arm $b'$ one of the pawl-fingers $f'$ falls into the depression $d'$ of bar D to permit the pawl to which said finger is attached to drop into engagement with an empty spool and actuate it to wind up the ribbon and change the direction of its feed, while the finger $f'$ of the remaining pawl rides upon one of the inclines $d^2$ or $d^3$ to the top of bar D to raise said pawl out of engagement with its respective spool-ratchet, which spool having been the winding-spool is filled with the ribbon and now becomes the unwinding-spool.

The operation is as follows: The spool A being the winding-spool, its pawl F is in action, while that for the spool A' is not, its pawl arm or finger $f'$ being then upon the top of bar D, as indicated to the right of Fig. 4. As each key-lever is depressed, it raises bail L to rock shaft H, which in turn rocks arm G to move pawl F to rotate the wheel A one or more teeth of its ratchet $a'$ at a time to wind the inking-ribbon thereon and move or feed it in one direction. As the inking-ribbon is gradually wound upon the spool A, the successive coils gradually move or slide wheel B and plate C toward the spool A', and the spring-pin E travels down the inclined face of the wedge $c^2$, with which it is in contact to steady the gradual movement of said plate and wheel. When the spool A is full, the apex of wedge has passed the spring-pin E, and the arm $b'$ is adjacent to the shoulder $d^4$ on bar D. The pin E then acts to quickly throw plate C to move the wheel B into contact with the hub or last coil of ribbon on spool A', and at the same time the arm $b'$ strikes the shoulder $d^4$ of bar D, and correspondingly throws it along with the plate C, whereupon the inclined end $d^2$ of depression $d'$ on bar D raises finger $f'$ of pawl F to the top of said bar for elevating or moving said pawl out of engagement with the spool A, and the finger $f'$ of pawl F' drops into the depression $d'$ of bar D to lower said pawl into engagement with the ratchet $a'$ of spool A' to rotate it for changing the direction of the feed of the inking-ribbon. The spool A' then becomes the winding-spool and reverses the direction of gradual sliding movement of wheel B and plate C toward the unwinding-spool A, so as to get into position to be quickly actuated by the spring-pin E when the spool A' is filled.

It will be noted that the foregoing-described shifting mechanism for changing the direction of feed of the inking-ribbon is automatic in its action and is under the control of the winding-spool. It is obvious that the novel features of the above-described automatically-acting shifting mechanism may be variously constructed and arranged for operation without departing from the spirit of my invention; and hence I do not limit it to any particular construction and arrangement of the same. The wheel B is preferably used to avoid friction on the winding-spool or its ribbon-coils thereon; but any other suitable bearing block or surface may be substituted therefor.

What I claim is—

1. The combination of the winding-spools having the pawls, the reversing-wheel having the reciprocating plate provided with the wedge-shaped projection, the spring-held pin acting upon the wedge, and mechanism interposed between the winding-spools and the reciprocating plate to reverse the motion of the spools, substantially as set forth.

2. The combination of the inking-ribbon spools, the rocking arm carrying the pawls and having inwardly-projecting arms, a reciprocating bar having a depression for the projecting arms, and a reversing-spool having reciprocating frame provided with an arm which reciprocates said bar, substantially as set forth.

3. The combination of the winding-spools, the rocking arm carrying the pawls and having arms, the reversing-spool having a reciprocating frame provided with a wedge carrying an arm, the reciprocating bar having a depression for the arms on the rocking arms, and a recess for the arm in the wedge, substantially as set forth.

In testimony whereof I affix my signature in presence of two witnesses.

GEORGE C. BLICKENSDERFER.

Witnesses:
S. J. VAN STAVOREN,
CHAS. F. VAN HORN.